United States Patent [19]

Mori et al.

[11] Patent Number: 4,617,682

[45] Date of Patent: Oct. 14, 1986

[54] METHOD AND APPARATUS FOR AUTOMATIC QUANTITATIVE MEASUREMENT OF TEXTURES BY IMAGE ANALYSIS

[75] Inventors: Makihiko Mori, Kitakatsuragigun; Kazuo Nakamura, Habikinoshi; Kanichiro Tanabe, Sagamiharashi; Atsushi Kimura, Urawashi, all of Japan

[73] Assignees: Osaka Gas Company Limited; Nireco Corporation, both of Japan

[21] Appl. No.: 715,876

[22] Filed: Mar. 25, 1985

[30] Foreign Application Priority Data

Mar. 27, 1984 [JP] Japan ................................. 59-57393

[51] Int. Cl.$^4$ .......................... G06K 9/00; H04N 7/18
[52] U.S. Cl. .................................. 382/28; 358/107; 382/52
[58] Field of Search ..................... 382/1, 8, 28, 52, 49; 358/106, 107; 356/372, 237

[56] References Cited

U.S. PATENT DOCUMENTS

| | | | |
|---|---|---|---|
| 3,805,035 | 4/1974 | Serra | 382/28 |
| 4,229,797 | 10/1980 | Ledley | 382/49 |
| 4,466,122 | 8/1984 | Auerbach | 358/107 |

*Primary Examiner*—Leo H. Boudreau
*Attorney, Agent, or Firm*—Webb, Burden, Robinson & Webb

[57] ABSTRACT

A method and an apparatus for automatic quantitative measurement of textures by image analysis for measuring textures of a material containing various optically anisotropic textures. An image of the material is divided into a plurality of sections and brightness of each section is classified into a plurality of stages to be stored as gray levels of the sections or pixels. Image patterns of the textures are recognized on the basis of gray level variations observed before and after a mask movement, and the textures of the material are determined according to predetermined criteria.

22 Claims, 9 Drawing Figures

METHOD AND APPARATUS FOR AUTOMATIC QUANTITATIVE MEASUREMENT OF TEXTURES BY IMAGE ANALYSIS

BACKGROUND OF THE INVENTION

This invention relates to a method and an apparatus for analyzing, by image analysis, textures of coke, pitch, synthetic graphite, sintered ore and other materials containing optically anisotropic textures, and more particularly to a method and an apparatus for quantitative measurement to automatically measure component ratios of the textures.

Coke, for example, contains various textures such as an isotropic texture, an anisotropic texture which shows particle patterns when seen through a microscope, an anisotropic texture which shows fibrous patterns, an anisotropic texture which shows relatively large leaflet patterns, and a texture derived from a coal inert tecture. With coke containing such optically anisotropic textures, these textures are known to be correlated to the blend of coking coals and coking conditions and also to coke performance such as strength, reactivity and so forth. Therefore, coke performance may be presumed from texture analysis data, and moreover such data may be used as control parameters for the blend of coking coals and coking conditions.

In conventional practice, measurement of texture component ratios (or ratios of the textures present) utilizing a microscope generally is carried out manually by the point-counting method. In practising this method an operator operates a polarizing microscope, selects a portion considered to include textures representing the entire field of view, and identifies the textures. This operation is repeated for many fields, preferably 500 or more fields to determine a rate of occurrence of each texture, which forms a basis for determining the texture component ratios in a sample. This conventional method of identifying the textures based on visual observations requires skill and experience and has the problem of exhausting the operators. Moreover, this method is prone to the operators' individual differences which entails poor reproduction of the results. An automatic measurement has been desired to solve these problems.

As far as coal textures are concerned, automatic measuring apparatus associated with a microscope have been developed. One such example is the reflectance measuring system. This system turns intensity of reflected light into a numerical value by means of a photomultiplier and an A/D converter in order to obtain a reflectance, from which the textures are automatically analyzed. However, this system is inapplicable to materials containing anisotropic textures, such as coke because the measured reflectance is primary data and texture identification based thereon lacks in analytic precision. A further method so far proposed for identifying coal textures obtains a microscopic field of image by using a TV camera and determines texture component ratios by a luminance histogram of the image. This method is unsatisfactory from the point of view of precision.

For analyzing the textures of semicoke a method has been proposed in which a polarizing plate adjacent a light source is turned to measure reflectance at certain turning angles and obtain maximum and minimum values thereof. From these values anisotropic indexes are calculated and the textures are classified by threshold levels. However, this method too is unsatisfactory from the point of view of precision.

SUMMARY OF THE INVENTION

An object of this invention is to provide a method of automatic quantitative measurement of textures which solves all of the problems noted above and is capable of identifying by image analysis the textures of materials containing optically anisotropic textures.

A further importanet object of this invention is to provide a method of automatically determining component ratios of the textures by repeating texture identification.

In order to achieve these objects the method of automatic quantitative measurement of textures according to this invention comprises the following steps:

(a) Pick up a microscopic texture image of a material by a TV camera, (b) Divide the texture image picked up by the TV camera into a plurality of pixels arranged vertically and horizontally, brightness of the pixels being classified into a plurality of stages to be stored in a frame memory as gray levels of the pixels, (c) Select a portion of the image stored in the frame memory to be a base area, (d) Select at least one reference area on the stored image, the reference area being equal in shape to the base area and displaced from the base area in an optional direction, (e) Obtain gray level variations of the reference area with respect to the base area, and (f) Identify the textures based on a correlation between the textures to be measured and the gray level variations concerning the textures.

The above texture identification may be repeated a predetermined number of times at a plurality of different points on a measuring face of the material to be measured, components ratios of the textures in the material being automatically determined based on results of the texture identification.

Furthermore, in order to carry out the above method of automatic quantitative measurement of textures the invention provides an apparatus comprising;

optical enlarging means for obtaining an enlarged texture image of the material to be measured, image pickup means for picking up the image obtained by the optical enlarging means, image storing means for storing the image picked up by the image pickup means, the image storing means dividing the image into a plurality of pixels arranged vertically and horizontally and stores brightness of the pixels as classified into a plurality of stages.

judgement information storing means for prestoring information relating to the textures in order to identify optically anisotropic textures contained in the material to be measured, area setting means for setting a base area of a predetermined size in an optional position on the image stored in the image storing means and at least one reference area in a position on the image displaced from the base area in an optional direction, the reference area being equal in size and shape to the base area, gray level variation calculating means for obtaining gray level variations of the reference area with respect to the base area, and texture identifying means for identifying the textures from the gray level variations by using the information stored in the judgment information storing means.

The above apparatus may further comprise arithmetic/logic means for evaluating components ratios of the textures, the arithmetic/logic means being adapted to repeat the texture identification a predetermined number of times at a plurality of different points on a measuring face of the material to be measured thereby to evaluate the component ratios of the textures in the material.

This invention has the following main advantages. As distinct from the conventional image processing system using a binary image, this invention divides a texture image into a plurality of pixels and stores brightness of the pixels as classified into a plurality of stages. This permits image patterns of material textures to be recognized on the basis of gray level variations thereof, whereby the patterns are identified with the textures. This pattern identification is similar to the case of texture identification carried out manually. Furthermore, since the process is automated, an unvarying degree of precision is assured at all times without any inconsistency in measurement results.

Other objects and advantages of this invention will be apparent from the following description.

DETAILED DESCRIPTION OF THE PREFERRED EMBODIMENT

Figure 1:
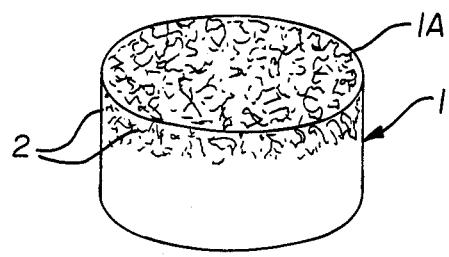
FIG. 1 is a perspective view of a coke sample used in the automatic quantitative measurement of textures according to this invention.

FIG. 1 shows a coke sample 1 for use in texture analysis as one example. This sample 1 is prepared by forming coke particles 2 from lump coke to be measured by the conventional reduction method, consolidating the particles 2 with a transparent synthetic resin 3, and cutting the resulting lump. The sample 1 has a polished face 1A which is to be measured. This invention uses such a sample to measure component ratios of textures constituting an objective material. A measuring method according to this invention will particularly be described hereinafter.

Figure 3:
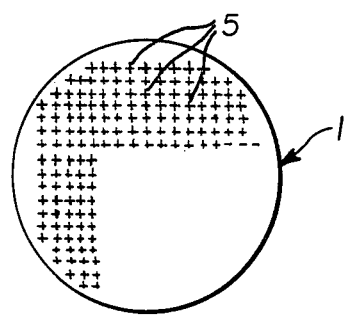
FIG. 3 is an explanatory view showing points of the sample to be measured.
Figure 4:
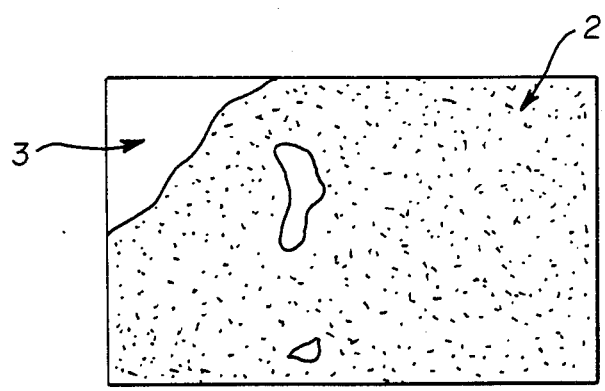
FIG. 4 is an explanatory view of an example of image corresponding to one of the points of the sample.
Figure 5A:
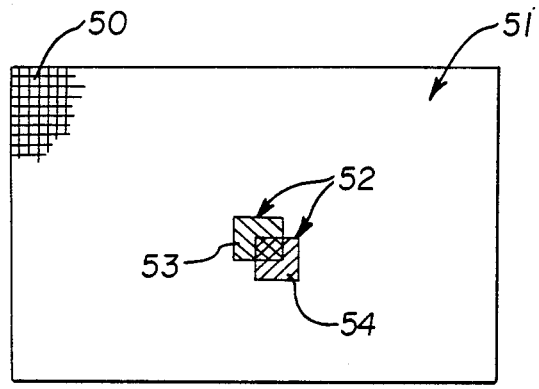
FIG. 5a is an explanatory view of an image stored in a frame memory and of a measuring mask for setting a base area and reference areas.

First, measuring points 5, for example five hundred points, are set at suitable intervals on the sample 1 containing the coke particles as shown in FIG. 3. These points 5 are measured one after another by using a polarizing microscope. Movement from one point 5 to another is controlled, together with focus adjustments at each point 5, by a predetermined program. Textures at each point 5 are picked up by a TV camera in the form of an image having an area 250 $\mu$m $\times$ 250 $\mu$m, an example of which is depicted in FIG. 4. The image is then divided into pixels 50 in 512$\times$512 arrangement as shown in FIG. 5a. Brightness of each pixel 50 is classified into 256 stages and is stored in a frame memory 51 as a gray level of each pixel 50.

At this step it is necessary to judge whether or not the coke particles are present in a field of the point 5 on the sample 1 because measurement for this field is unnecessary if this field includes the resin 3 only. For this purpose the gray levels obtained from the brightness are used as criterion for the judgment. More particularly, the gray levels of the resin 3 are lower than those of the coke particles 2, and whether or not the coke particles occupy at least 50% of the field is judged on the basis of the gray levels of the whole image. This judgment provides a basis for deciding whether this point 5 should proceed to a coke texture identifying step or should be dismissed in favor of a next point 5. These judgments are made by a predetermined program on the basis of prestored data relating to texture image judgment by the gray levels.

When the image includes 50% or more of coke textures, an area 50 $\mu$m $\times$ 50 $\mu$m around the center of the image is selected by a measuring mask 52 to be a base area 53. Thereafter the base area 53 undergoes a process of determining its textures. In this process, "coarseness" which will be defined later is obtained by a sequence characteristic of this invention to be described in the paragraphs that follow. Each texture is identified by prestored criteria.

Figure 5B:
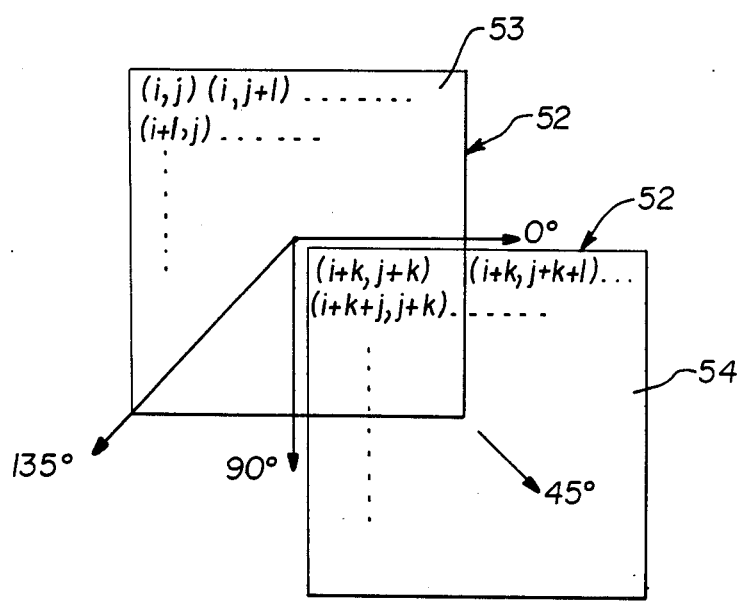
FIG. 5b is an explanatory view showing a relationship between the base area, one of the reference areas, and pixels in the respective areas.

This identifying sequence will now be particularly described with reference to FIGS. 5a and 5b. By way of explanation the gray levels of the pixels 50 stored in the frame memory 51 are expressed by using a matrix as $P$ (512$\times$512). Thus, all pixels 50 may be included in the following matrix:

$$P (512 \times 512) = \begin{pmatrix} P_{1,1} & P_{1,2} & \cdots & P_{1,512} \\ P_{2,1} & P_{2,2} & \cdots & P_{2,512} \\ \vdots & \vdots & & \vdots \\ P_{512,1} & P_{512,2} & \cdots & P_{512,512} \end{pmatrix}$$

wherein $P_{i,j}$ (i=1 - - - 512, j=1 - - - 512) represents the gray levels of each pixel. First, texture patterns in the base area 53 selected by the measuring mask 52 are expressed as:

$$P_o((n+1) \times (n+1)) = \begin{pmatrix} P_{i,j} & P_{i,j+1} & \cdots & P_{i,j+n} \\ \vdots & \vdots & & \vdots \\ P_{i+n,j} & P_{i+n,j+1} & \cdots & P_{i+n,j+n} \end{pmatrix}$$

wherein n+1 is a value corresponding to the length of a sideline of the measuring mask, i.e. 50 $\mu$m. (In FIG. 5b, the pixels are indicated only by subscripts of the matrix elements.) Next, the measuring mask 52 is moved from the base area horizontally rightward to select a first reference area, and then 45° clockwise from the first reference area to select a second reference area 54. A third and a fourth reference areas are selected by moving the measuring mask 52 similarly round the base area. As shown in FIG. 5b, the second reference area 54, for example, has the following texture patterns:

$$\wp_2((n+)\times(n+1)) = \begin{pmatrix} P_{i+k,j+k} & P_{i+k,j+k+1} & \cdots & P_{i+k,j+k+n} \\ \vdots & \vdots & & \vdots \\ P_{i+k+n,j+k} & P_{i+k+n,j+k+1} & \cdots & P_{i+k+n,j+k+n} \end{pmatrix}$$

wherein k is a value corresponding to an amount of displacement. Each time the reference area is selected an amount of gray level variation of the reference area with respect to the base area, namely $\wp x - \wp o$, (x=1, 2, 3, 4), is calculated. Such a gray level variation is closely related to the texture pattern; the variation is small where the texture comprises uniformly distributed fine particles, that is to say the texture has a high degree of correlation, and the variation is great where the texture comprises unevenly distributed particles, that is to say the texture has a low degree of correlation.

Assume that a given number N of pixels are present in the base area. Then, a reference area is selected at a position displaced from the base area, and a difference in the gray level between a pixel in the base area and a corresponding pixel in the reference area is obtained. A sum total of absolute values of such differences N in number divided by N makes an average variation for each pixel which is defined herein as "coarseness". Thus, the "coarseness" of the second reference area 54 with respect to the base area 53 as shown in FIG. 5b is expressed in the following equation:

$$\text{Coarseness} = \frac{|\wp_2 - \wp_0|}{(n+1)\times(n+1)} =$$

$$\frac{|P_{i+k,j+k} - P_{i,j}| \cdots + |P_{i+k+n,j+k+n} - P_{i+n,j+n}|}{(n+1)\times(n+1)} =$$

$$\frac{\sum_{i=i}^{i+n}\sum_{j=j}^{j+n}|P_{i+k,j+k} - P_{i,j}|}{(n+1)\times(n+1)}$$

Figure 6:
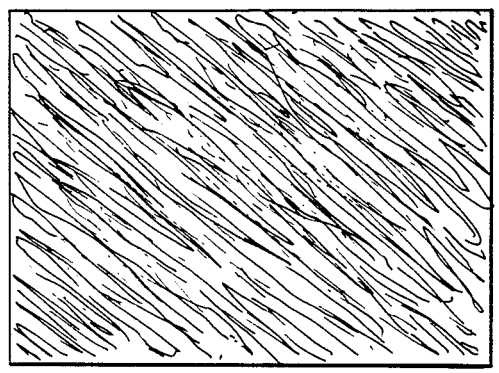
FIG. 6 is a view showing an image of a fibrous texture.

It will be understood that the "coarseness" has a small value where the base area and the reference area have resembling textures or a high degree of correlation in texture, and a large value where opposite is the case. For example, a fibrous texture as shown in FIG. 6 has a relatively high degree of correlation in directions parallel to flow of the pattern and a lower degree of correlation across the flow. Therefore, this kind of texture is accurately determined by taking into account the differences in "coarseness" taken from each of the 0°, 45°, 90° and 135° reference areas in addition to the degree of "coarseness". This determining process too is automatically carried out by the prestored program.

After identifying the textures of one measuring point 5, the resulting data are stored and then textures of a next measuring point 5 are identified in the same manner as described above. This is repeated to cover all the measuring points, i.e. 500 times. During this process the number of identified textures is counted and from this number component ratios of the textures contained in the coke are ultimately derived.

Coke, which is one example of materials to which the present measuring method is applicable, was measured according to the following criteria to identify its textures on the basis of the described "coarseness" data:

(1) For isotropic textures, the "coarseness" was set to 8 or less regardless of directions of mask movement.
(2) For anisotropic textures consisting of particles not exceeding 1.5μ, the "coarseness" was set to over 8 and up to 23 regardless of directions of mask movement.
(3) For anisotropic textures consisting of particles 1.5–10μ, the "coarseness" was set to over 23 and up to 40 regardless of directions of mask movement.
(4) For fibrous textures 10μ or more long and 10μ or less wide as shown in FIG. 6, the "coarseness" depending on directions varied twofold or more.
(5) For anisotropic textures 10μ or more in both width and length, the "coarseness" was set to over 40 regardless of directions of mask movement.
(6) For inert textures, the "coarseness" was set to over 8 and up to 40 regardless of directions of mask movement, and the gray levels were set equal to those for uniform textures as in the criterion 1 above.

Figure 7:
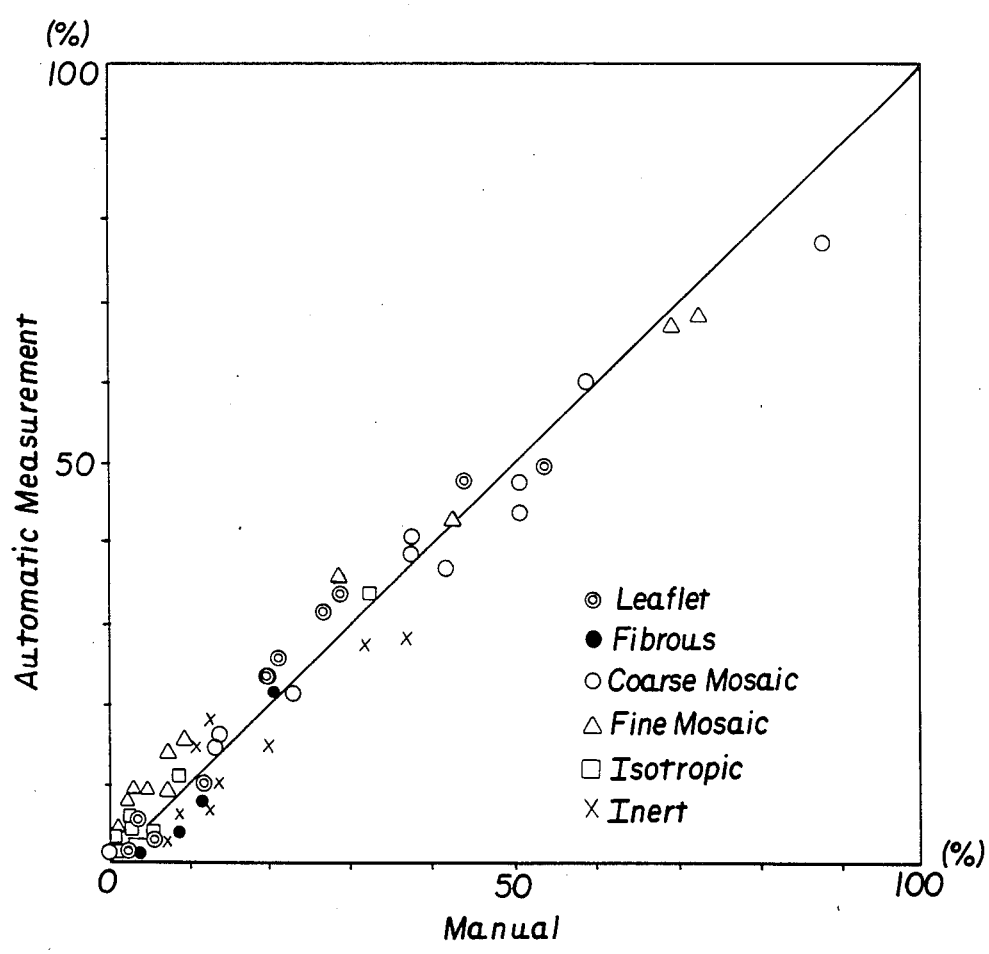
FIG. 7 is a graph comparing results obtained from the automatic measurement according to this invention with results obtained from manual measurement.

The textures of each point 5 on the sample 1 were automatically identified by the above criteria, to determine its component ratios. The results were compared with results obtained by manual measurement, as shown in FIG. 7. It will be seen that the method according to this invention produced satisfactory results and proved to have a sufficiently practical advantage over manual measurement.

The method according to this invention is variable with respect to its procedural details and identifying criteria according to materials to be measured. However, it has been found that the variations do not affect the practicability of the method in judging textures on the basis of "coarseness" as herein defined.

Figure 2:
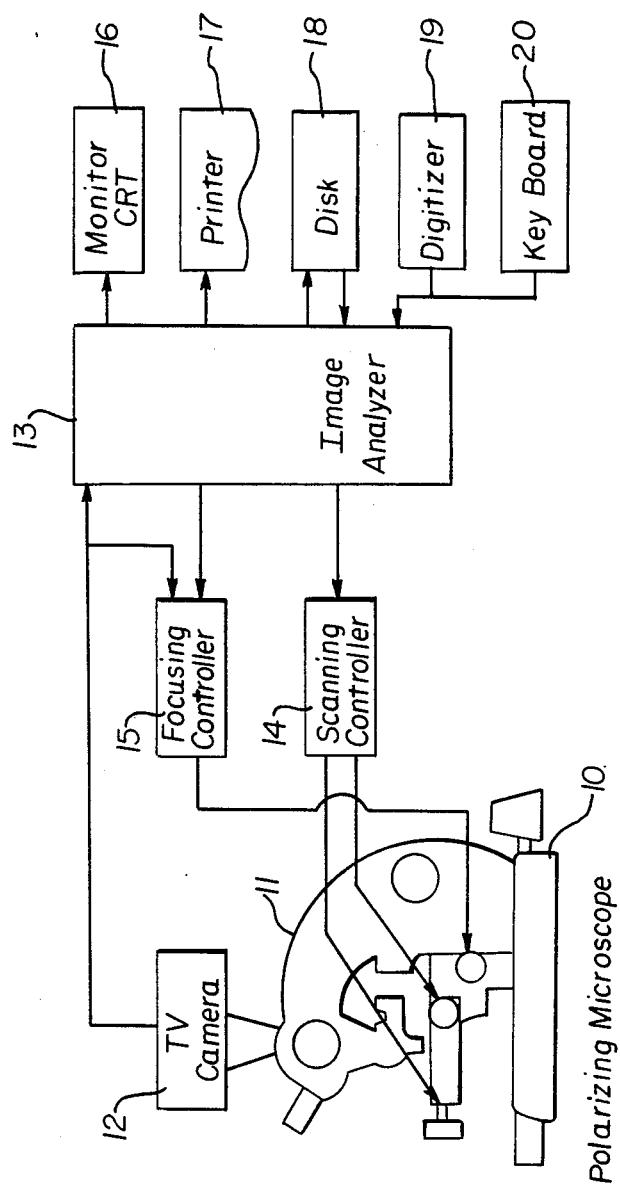
FIG. 2 is a schematic diagram of an apparatus for the automatic quantitative measurement of textures according to this invention.

Description will be made hereinafter of an automatic quantitative texture measuring apparatus for carrying out the method of this invention. This apparatus, as schematically shown in FIG. 2, comprises a stage device 10 for placing the sample 1 in position, a polarizing microscope 11 for viewing the measurement face 1A of the sample 1, a TV camera 12 for picking up an image of the face 1A from the microscope 11, and a central unit 13 for processing the image picked up by the TV camera 12 in a manner characteristic of the invention as particularly described later. The TV camera 12 may comprise a CCD element or an MOS image sensor. The central unit 13 is provided with a CRT 16 for monitoring a field for measurement, a printer 17 for printing out results of the measurement, an auxiliary disk device 18, a digitizer 19, and a keyboard 20.

The stage device 10, though not shown in detail, includes known means to fix the sample 1. Furthermore, this stage device 10 is, as well known in the art, an automatic scanning stage device and is provided with a scanning controller 14 for moving the stage in a controlled manner. The scanning controller 14 moves the stage device 10 under control of the central unit 13 as described later.

The polarizing microscope 11 is provided with an automatic focusing controller 15 as schematically shown, to be controllable to obtain clear images at all times including times of movement of viewing fields. This automatic focusing controller 15 also is operable under control by the central unit 13, and may comprise any known mechanism.

The TV camera 12 is assembled to the polarizing microscope 11 to pick up the image from the latter and provide the central unit 13 with corresponding image signals. This TV camera 12 should desirably have a high degree of resolution.

The central unit 13 is adapted to receive the image signals relating to a measuring field picked up by the TV camera 12, to carry out A/D conversion on the brightness of each point in the field, to determine the gray levels of each pixel, and to form a digital image of the measuring field. The central unit 13 includes means to automatically carry out the quantitative measurement of textures which characterizes this invention, namely an image storing device, an image judging device for discriminating coke textures from other textures, a judgment information storing device for storing information on each texture, an area setting device for controlling the measuring mask, a gray level variation calculating device, a texture identifying device, and an arithmetic/logic device for evaluating the component ratios of textures.

The above image storing device comprises a frame memory for storing the image of the measuring field as a digital image. This frame memory has functions to divide a plane forming the image into over 100×100 pixels, and normally into 512×512 pixels, to classify the brightness thereof into several tens of stages, normally at least 64 stages and preferably 256 to 1,024 stages, and to store the classified brightness as the gray levels of the pixels. Thus, the digital image used in this invention is not a binary image.

The image judging device judges from an average brightness of an entire image whether the image is of coke textures or of textures of a resin embedded in the sample. When the image is judged to be of the resin, the measurement is stopped and a next field is measured.

The judgment information storing device is for storing, in advance, data relating to each of the textures to be identified which are contained in the material to be measured. These data are input to the central unit 13 beforehand by operating the keyboard 20. The data relating to the textures to be identified are variable with the materials to be measured and the textures to be identified. Therefore, the data are selected as necessary and this is not limited to static data relating to the gray levels and others. According to this invention, the data relating to gray level variations peculiar to texture patterns before and after the measuring area is moved a slight distance as hereinbefore described are stored for use in identifying the textures.

The area setting device and the gray level variation calculating device obtain a correlation in gray levels between the base area and reference areas of equal size to the base area and displaced therefrom in optional directions. The texture identifying device compares this correlation with characteristic features of the textures stored in the judgment information storing device and identifies the texture in those areas. In this way a plurality of points on the sample are measured in a predetermined sequence and the component ratios of the textures are calculated. The results are printed out by the printer 17 for example.

Figure 8:
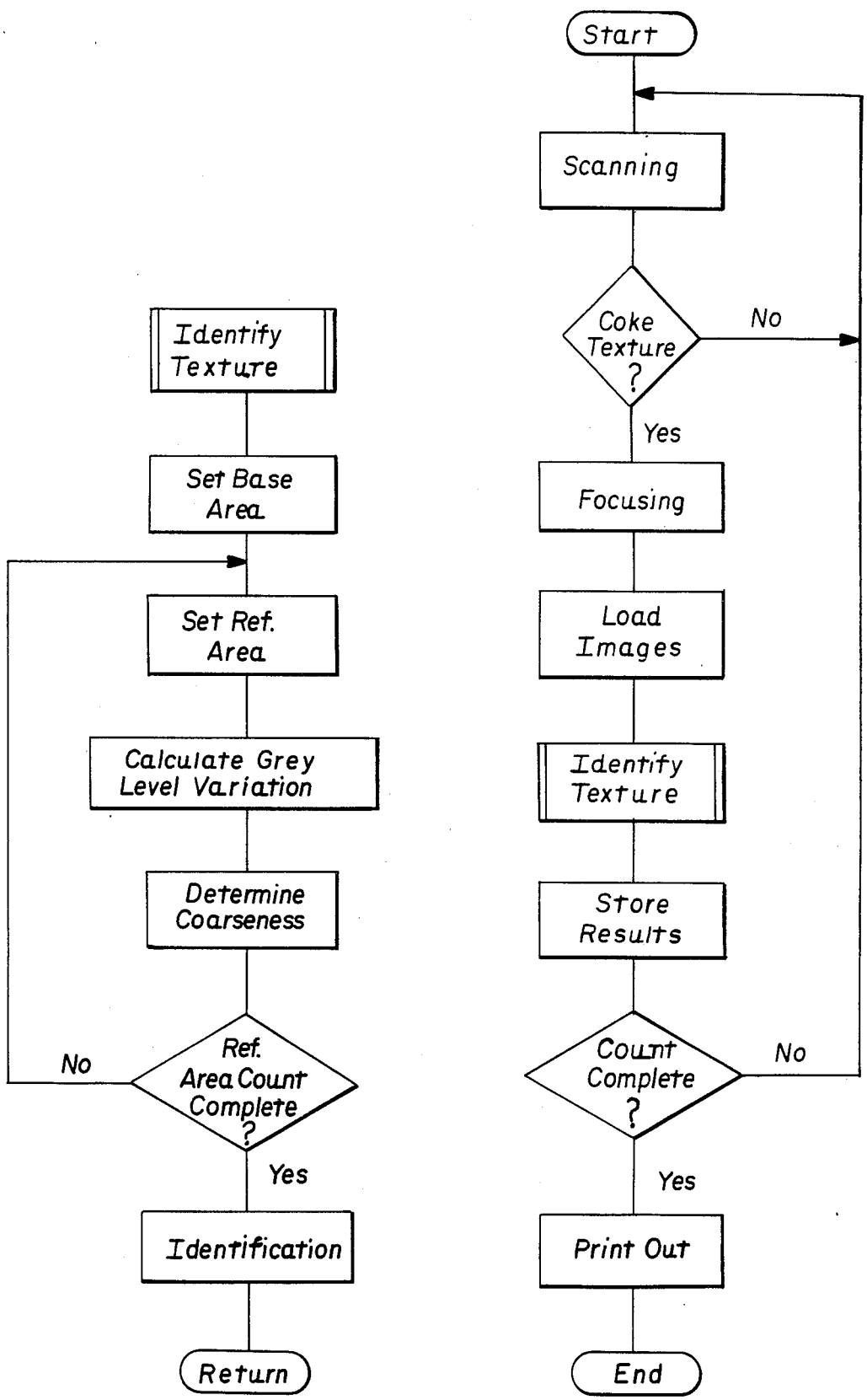
FIG. 8 is a rough flowchart of a measurement process according to one embodiment of this invention.

The foregoing sequence is executed by a predetermined program. A rough flowchart of the sequence is shown in FIG. 8.

What is claimed is:

1. A method of automatic quantitative measurement of textures by image analysis for measuring textures of a material containing various optical anisotropic textures, comprising the steps of;
    (a) picking up a microscopic texture image of the material by a TV camera,
    (b) dividing the texture image picked up by the TV camera into a plurality of pixels arranged vertically and horizontally, brightness of the pixels being classified into a plurality of stages to be stored in a frame memory as gray levels of the pixels,
    (c) selecting a portion of the image stored in the frame memory to be a base area,
    (d) selecting at least one reference area on the stored image, said reference area being equal in shape to the base area and displaced from the base area in an optional direction,
    (e) obtaining gray level variations of the reference area with respect to the base area, and
    (f) identifying the textures based on a correlation between the textures to be measured and the gray level variations concerning the textures.

2. A method of automatic quantitative measurement of textures as claimed in claim 1 wherein, in the step of storing the image picked up by the TV camera in the frame memory, the picked up image is divided into at least 100×100 pixels and the brightness of each of the pixels is classified into at least 64 stages to be stored in the frame memory as the gray levels of the pixels.

3. A method of automatic quantitative measurement of textures as claimed in claim 2 wherein, in the step of storing the image picked up by the TV camera in the frame memory, the picked up image is divided into 512×512 pixels and the brightness of each of the pixels is classified into 256 to 1,024 stages to be stored in the frame memory as the gray levels of the pixels.

4. A method of automatic quantitative measurement of textures as claimed in claim 2 wherein, in the step of obtaining the gray level variation of the reference area with respect to the base area, differences in brightness between all pixels in the base area and corresponding pixels in the reference area are obtained respectively, and a sum total of absolute values of the differences is divided by a total number of the pixels in each area, whereby the gray level variation is obtained.

5. A method of automatic quantitative measurement of textures as claimed in claim 4 wherein, in the step of selecting at least one reference area, at least two reference areas displaced from the base area in at least two directions are selected.

6. A method of automatic quantitative measurement of textures as claimed in claim 5 wherein, in the step of selecting the reference areas, a first reference area is selected in a position displaced horizontally from the base area, and second, third and fourth reference areas are selected at positions displaced from the base area and displaced clockwise from the first reference area by 45 degrees, 90 degrees and 135 degrees, respectively.

7. A method of automatic quantitative measurement of textures as claimed in claim 5 wherein the texture identification is repeated a predetermined number of times at a plurality of different points on a measuring face of the material to be measured, component ratios of the textures in the material being automatically determined based on results of the texture identification.

8. A method of automatic quantitative measurement of textures as claimed in claim 7 comprising a further step of judging from the brightness of the pixels whether or not the image stored in the frame memory is suited for the quantitative measurement.

9. An apparatus for automatic quantitative measurement of textures by image analysis for measuring textures of a material containing various optical anisotropic textures, comprising;
optical enlarging means for obtaining an enlarged texture image of the material to be measured,
image pickup means for picking up the image obtained by the optical enlarging means,
image storing means for storing the image picked up by the image pickup means, the image storing means dividing the image into a plurality of pixels arranged vertically and horizontally and stores brightness of the pixels as classified into a plurality of stages,
judgment information storing means for prestoring information relating to the textures in order to identify optically anisotropic textures contained in the material to be measured,
area setting means for setting a base area of a predetermined size in an optional position on the image stored in the image storing means and at least one reference area in a position on the image displaced from the base area in an optional direction, the reference area being equal in size and shape to the base area,
gray level variation calculating means for obtaining gray level variations of the reference area with respect to the base area, and
texture identifying means for identifying the textures from the gray level variations by using the information stored in the judgment information storing means.

10. An apparatus for automatic quantitative measurement of textures as claimed in claim 9 wherein the image storing means divides the picked up image into at least 100×100 pixels and classifies the brightness of each of the pixels into at least 64 stages to be stored in a frame memory as gray levels of the pixels.

11. An apparatus for atomatic quantitative measurement of textures as claimed in claim 10 wherein the image storing means divedes the picked up image into 512×512 pixels and classifies the brightness of each pixel into 256 to 1,024 stages to be stored in the frame memory as the gray levels of the pixels.

12. An apparatus for automatic quantitative measurement of textures as claimed in claim 10 wherein the gray level variation calculating means obtains differences in brightness between all pixels in the base area and corresponding pixels in the reference area, respectively, and divides a sum total of absolute values of the differences by a total number of the pixels in each area, thereby to obtain the gray level variation.

13. An apparatus for automatic quantitative measurement of textures as claimed in claim 12 wherein the area setting means selects at least two reference areas displaced from the base area in at least two directions.

14. An apparatus for automatic quantitative measurement of textures as claimed in claim 13 wherein the area setting means selects a first reference area in a position displaced horizontally from the base area, and second, third and fourth reference areas at positions displaced from the base area and displaced clockwise from the first reference area by 45 degrees, 90 degrees and 135 degrees, respectively.

15. An apparatus for automatic quantitative measurement of textures as claimed in claim 13 further comprising arithmetic/logic means for evaluating component ratios of the textures, the arithmetic/logic means being adapted to repeat the texture identification a predetermined number of times at a plurality of different points on a measuring face of the material to be measured thereby to evaluate the component ratios of the textures in the material.

16. An apparatus for automatic quantitative measurement of textures as claimed in claim 15 further comprising image judging means for judging from the brightness of the pixels whether or not the image stored in the frame memory is suited for the quantitative measurement.

17. An apparatus for automatic quantitative measurement of textures as claimed in claim 16 further comprising material support means for causing the measuring face of the material to be measured at a plurality of points thereon, the material support means being movable for an automatic scanning operation.

18. An apparatus for automatic quantitative measurement of textures as claimed in claim 17 wherein the optical enlarging means comprises a polarizing microscope.

19. An apparatus for automatic quantitative measurement of textures as claimed in claim 18 wherein the optical enlarging means includes an automatic focusing mechanism.

20. An apparatus for automatic quantitative measurement of textures as claimed in claim 9 wherein the image pickup means comprises a TV camera.

21. An apparatus for automatic quantitative measurement of textures as claimed in claim 20 wherein the TV camera comprises a CCD pickup element.

22. An apparatus for automatic quantitative measurement of textures as claimed in claim 18 further comprising a printer for outputting the component ratios of the textures obtained by the arithmetic/logic means.

* * * * *

UNITED STATES PATENT AND TRADEMARK OFFICE
CERTIFICATE OF CORRECTION

PATENT NO. : 4,617,682

DATED : October 14, 1986

INVENTOR(S) : Makihiko Mori et al.

It is certified that error appears in the above-identified patent and that said Letters Patent is hereby corrected as shown below:

Column 2 Line 10 "importaint" should read --important--.

Column 5 Line 8 "(n + )" should read -- (n + 1) --.

Column 5 Line 60 "degree" should read --degrees--.

Claim 11 - Column 9 Line 43 "atomatic" should read --automatic--.

Signed and Sealed this

Third Day of February, 1987

Attest:

DONALD J. QUIGG

Attesting Officer

Commissioner of Patents and Trademarks